United States Patent [19]
Quenot

[11] 3,922,790
[45] Dec. 2, 1975

[54] LINEAR MEASURING INSTRUMENT
[75] Inventor: Michel Quenot, Besancon, France
[73] Assignee: Stanley-Mabo, Besancon, France
[22] Filed: Apr. 18, 1974
[21] Appl. No.: 461,849

[30] Foreign Application Priority Data
Apr. 20, 1973 France .................... 73.14643

[52] U.S. Cl. .................. 33/138; 74/547; 188/83; 242/84.1 J; 242/84.8
[51] Int. Cl.² .................. G01B 3/10; G05G 1/12
[58] Field of Search ........... 33/137, 138; 242/84.8, 242/84.1 J; 188/83; 74/545, 547; 220/1 A

[56] References Cited
UNITED STATES PATENTS

| | | | |
|---|---|---|---|
| 2,893,655 | 7/1959 | Carlson | 242/84.8 |
| 3,686,767 | 8/1972 | Duda et al. | 33/138 |
| 3,778,001 | 12/1973 | Hull | 242/84.5 A |

*Primary Examiner*—Richard E. Aegerter
*Assistant Examiner*—Steven L. Stephan
*Attorney, Agent, or Firm*—Prutzman, Hayes, Kalb & Chilton

[57] ABSTRACT

The mounting of a crank on a rotatable winding drum of a tape measure assembly is effected by providing the crank with oppositely-directed pivot lugs which are engaged in housings formed in lateral walls of a slot formed in the drum, the pivot lugs being detachably retained in their housings by a resilient part of the winding drum which constitutes the base of the slot.

17 Claims, 14 Drawing Figures

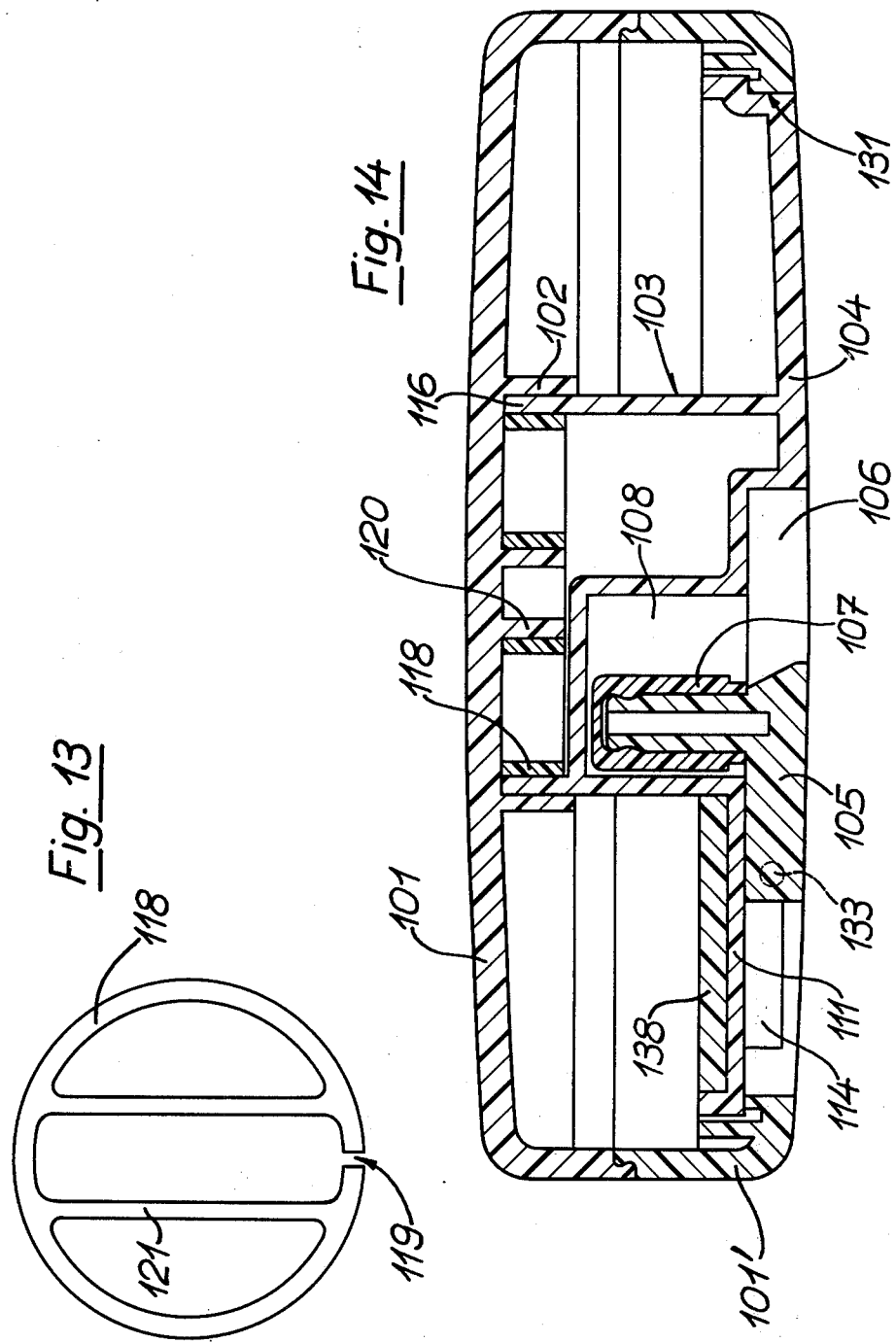

LINEAR MEASURING INSTRUMENT

The present invention relates to a tape measure assembly in which the measuring tape is wound onto a winding drum.

Known assemblies have drums provided with a central boss and which can rotate about a pivot of the assembly casing, the drum having brake and drive means, the latter being constituted by a crank mounted in a recess in a side-plate of the drum and able to pivot between an inoperative position and an operative position. According to certain known assemblies, the crank is mounted in a groove bordered by two bosses and is pivoted about a metal pin passing through it and the ends of which are housed in apertures provided in the bosses. This type of crank has the drawback of not being able to be readily dismantled and of requiring delicate machining operations during manufacture.

It is an object of the present invention to obviate or mitigate the aforesaid disadvantages.

According to the present invention there is provided a tape measure assembly constituted by a casing in which a winding drum provided with a central boss on which a tape measure is wound, is rotatably mounted, the drum having braking means and driving means, the driving means comprising a crank detachably mounted in a slot in an outer face of a side-plate of the drum and which can pivot between an inoperative position and an operative position and which is formed integrally with a pivot constituted by two lugs projecting from opposite edges of the crank adjacent one of its ends, the lugs being engageable in housings provided in lateral walls of the slot and retained by a resilient part of the slot base.

Preferably, the drum braking means is constituted by an open ring freely mounted on the axis of rotation of the casing, the ring being prevented from rotating by a pin integral with the axis of rotation and being pressed resiliently against the inner wall of the central boss of the winding drum by a spring housed in a diametral groove of the axis of rotation.

This gives a more regular movement of the measuring tape into and out of the casing than has hitherto been possible.

The invention also provides an improved method of attaching the measuring tape to the winding drum. Hitherto, the ribbons of measuring tapes were attached to the winding drum by means of a loop formed at the end of the tape and threaded onto a finger provided close to the periphery of the drum or directly on the axis of the drum. In the case of steel tapes, it has thus been necessary to provide their ends with a flexible terminal piece of leather or plastics material, riveted to the tape. In another known device, jaws are formed at the periphery of the drum which co-operate with means fixed to the end of the tape.

In the present invention, the tape is preferably detachably fixed in a slot in the lateral wall of the winding drum arranged in a plane perpendicular to the axis of the drum, the tape having recesses in one end so as to form a hook which co-operates with the edges of said slot.

A tape measure assembly according to the invention is very simple and comprises few constituent parts so that it may be easily mass manufactured by injection moulding a plastics material. Thus it is possible to obtain very good production efficiency.

Embodiments of the present invention will now be described, by way of example, and with reference to the accompanying drawings, in which:

FIG. 13 is a view of a brake washer used in the second embodiment;

FIG. 14 is a sectional view of the assembled casing according to the second embodiment.

Figure 1:
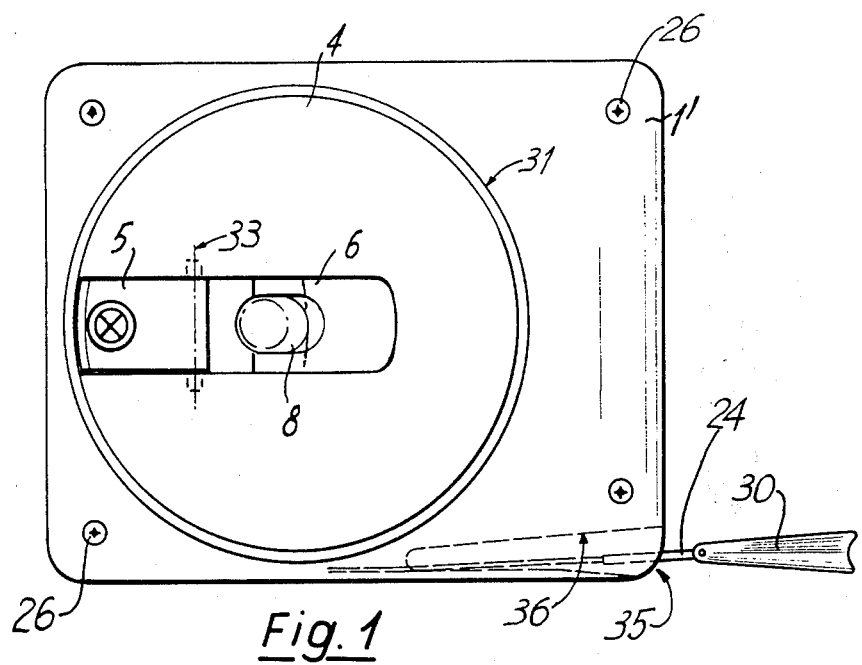
FIG. 1 is an elevational view of the tape measure assembly according to the invention.
Figure 4:
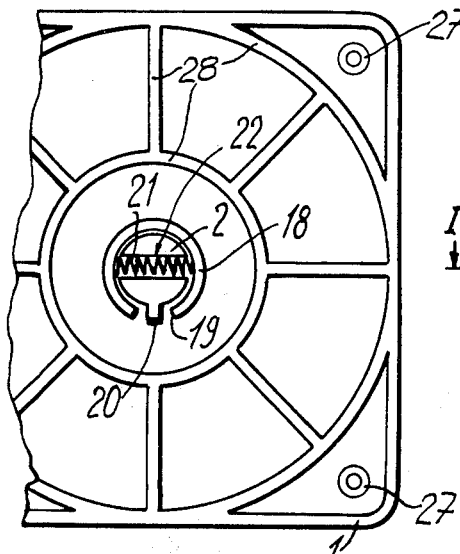
FIG. 4 is a fragmentary view of the inner face of the casing showing details of the brake means.

The tape measure assembly according to the invention comprises a casing formed of two opposed parts 1 (FIG. 4) and a part 1' (FIG. 1), the latter fitting on the part 1 and being secured by screws 26 engaging in tapped holes provided in tenons 27 formed on the inner face of the part 1. Alternatively, the parts may be clipped together.

Figure 2:
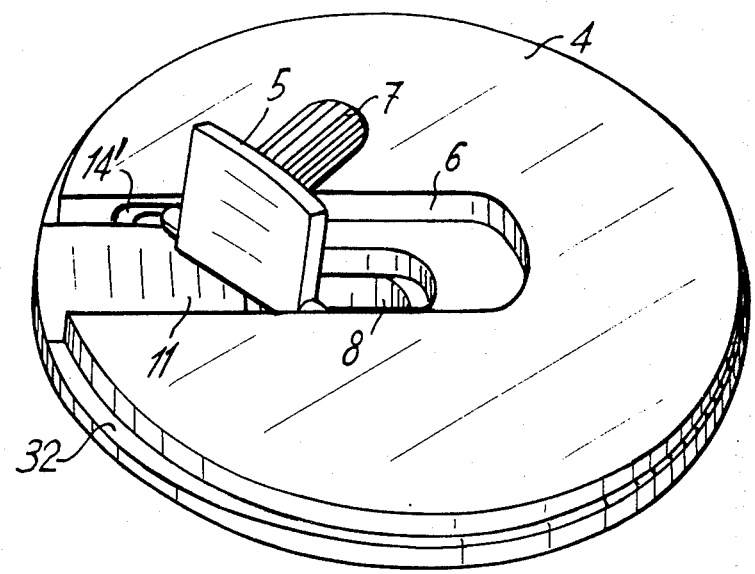
FIG. 2 is a perspective view of the winding drum with the crank.
Figure 5:
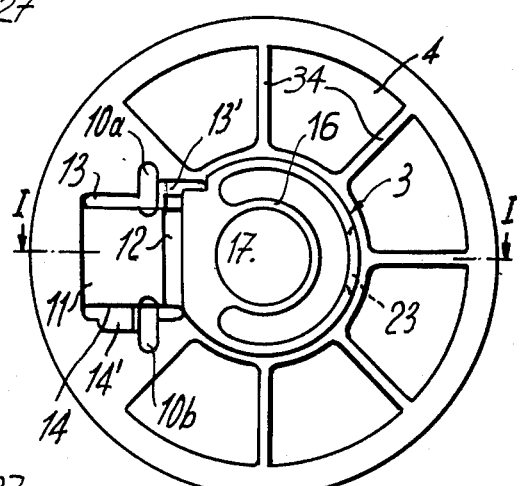
FIG. 5 is a view of the winding drum shown in FIG. 2.
Figure 7:
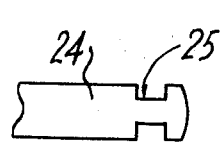
FIG. 7 is a detail view of the end of the measuring tape.

On its inner face, the part 1 comprises reinforcing ribs 28 and a pivot 2 on which is rotatably mounted a drum 3 (FIGS. 2, 3, 5) for winding the measuring tape 24. The tape leaves the casing through an outlet 35 and comprises a pulling ring 30 at its free end. The drum 3 is provided with a side-plate 4, on the outer face of which is rotatably and detachably fixed a crank 5 for driving the drum.

The part 1' is provided with a circular aperture 31 in which is housed the side-plate 4 of the drum 3, such that the edge of the aperture 31 covers a peripheral shoulder 32 of the side-plate 4 (FIG. 2) and retains the drum in this way. The side-plate 4 is provided on its outer face with a slot 6 arranged in the diametral direction and in which is housed the crank 5 which supports a member 7. The crank 5 may be tilted through 180° about its axis of rotation 33 (FIG. 1) between an inoperative position and an operative position. In the inoperative position, it is countersunk in the slot 6, the member 7 being countersunk in an aperture 8 of the side-plate 4 opening into the slot 6.

Figure 6:
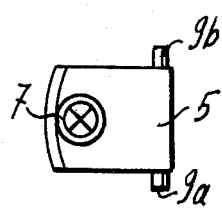
FIG. 6 is a detail view of the crank.

The pivot pin of the crank (FIG. 6) is constituted by two lugs 9a, 9b projecting from the edges of the crank adjacent the end which is spaced from the member 7 and are formed integrally with the crank. These lugs 9a, 9b are housed in corresponding housings 10a, 10b provided in the lateral faces of the slot 6 and opening into the inner face of the side-plate 4. A part of the base of the slot 6 forms a resilient tongue 11 whose free end is directed towards the center of the side-plate 4 whereas the opposite end is integral with the side-plate 4. This tongue 11 is defined by a slot 12 passing through the base of the slot 6 and by longitudinal recesses 13, 14 formed in the lateral walls of the slot 6 in the region where the lateral walls and the base of the slot 6 intersect. Furthermore, the housings 10a, 10b for the lugs 9a, 9b open into the recesses 13 and 14, each of the recesses having an enlarged part 13', 14' opening into the inner face of the side-plate 4 and respectively located on either side of the axis 33 of the crank. The enlarged part 13' opens into the right-hand side of the housing 10a as viewed in FIG. 5, whereas the enlarged part 14' opens into the left-hand side of the housing 10b as viewed in FIG. 5. Furthermore, these enlarged parts 13', 14' open into the lateral walls of the slot 6 and are such that their width is slightly less than the diameter of the lugs 9a, 9b of the crank 5. A nose 15 (FIG. 3) is formed between the enlarged part 14' of the cut-out and the corresponding housing 10b. The free end of the tongue 11 bears against the inner face of the crank 5, in the region of the lugs 9a, 9b.

During the assembly of the crank 5 on the side-plate 4, the crank is introduced at right-angles to the side-plate and inclined with respect to the longitudinal direction of the slot 6 into the slot 6 (FIG. 2) in order that its lugs 9a, 9b are located opposite the enlarged parts 13', 14' of the cut outs. By a rotating movement with slight pressure and owing to the deformation of the resilient tongue 11, the crank is then forced to come into a position at right-angles to the direction of the slot 6 and its lugs 9a, 9b are thus forced into the enlarged cut-outs 13', 14' and are then engaged in the housings 10a, 10b and retained in these housings by the noses 15.

The side-plate and crank are preferably made from plastics material, for example acetate resin or polyamide resin known by the trade names "Delrin" and nylon respectively, so as to have a certain resiliency. Thus, when the crank is rotated in the opposite direction, to that of the assembly, the crank may be readily separated from the side-plate. Furthermore, due to its resiliency, the flexible tongue 11 fulfils the function of a retaining spring for the crank either in the operative position or inoperative position.

The winding drum 3 has ribs 34 and a central boss 16, whereof the opening 17 has a diameter slightly greater than the diameter of the pivot 2, such that free rotation is possible between the two. In order to ensure a smooth return of the measuring tape into the casing during the actuation of the crank 5, a braking device (FIG. 4) is provided, constituted by an open ring 18, preferably of acetate resin or polyamide, mounted about the pivot 2. Housed in a slot 19 of this ring 18 is a pin 20 formed on the lateral wall of the pivot 2 in order to prevent any rotation of the ring 18 about said pivot. A spring 21, housed in a diametral groove 22 of the pivot 2, keeps the ring 18 in a position pressed against the sides of the opening 17 of the winding drum, when the latter is fitted on the pivot. The central boss 16 of the winding drum and the ring 18 are preferably of two different plastics materials, which gives the braking device a long life.

Figure 3:
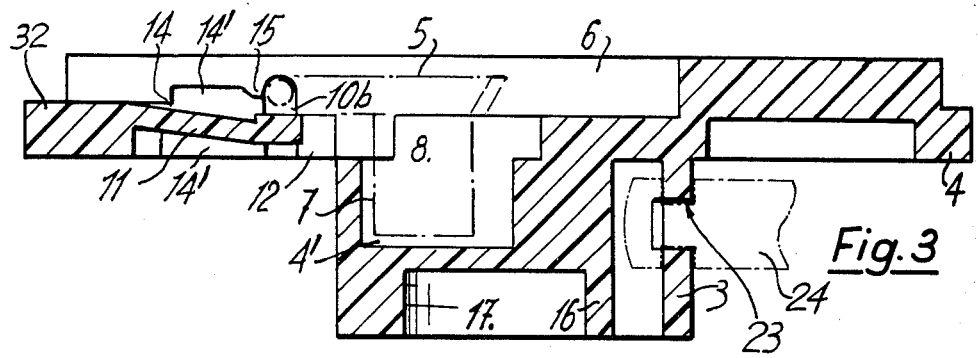
FIG. 3 is a view of the winding drum on section line I—I of FIG. 5 showing the location of the crank in an inoperative position.

The peripheral wall of the winding drum 3 is provided with a slot 23 which is arranged in a plane perpendicular to the axis of the drum and whose edges parallel to said axis are chamfered and in which is fixed the inner end of the measuring tape 24 (FIG. 3). For this purpose, the end of the tape is provided with two slots 25 which form a hook, the width of the tape at this position corresponding to the width of the slot 23. Thus, after having introduced the end of the tape 24 (FIG. 3) the tape being parallel to the side-plate 4, into the slot 23 until the slots 25 are opposite the edges of the slot 23, it is sufficient to pivot the tape through 90° in order that its end is hooked into the slot 23.

The side of the casing (FIG. 1) is provided with a housing 36 into which opens the outlet 35 for the tape 24, this housing 36 being such that it can completely contain the pulling ring 30 of the tape, when the latter is completely wound in the casing.

Figure 8:
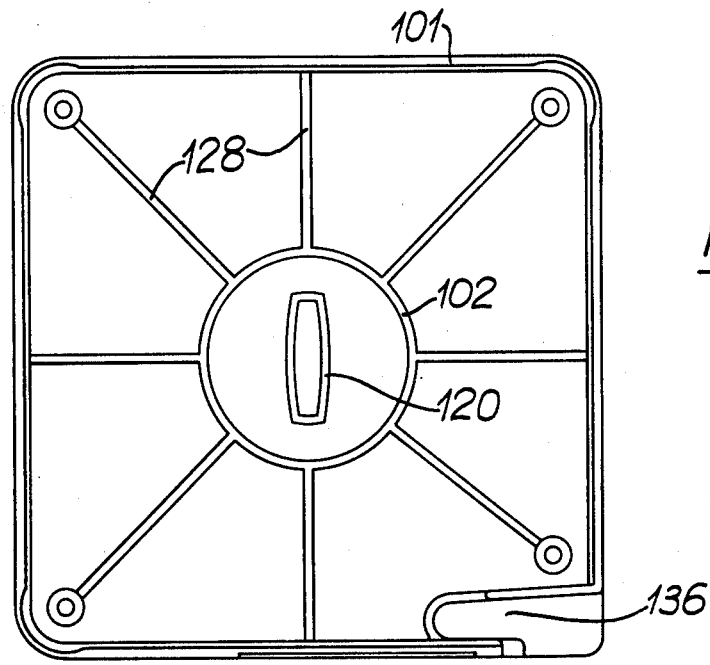
FIG. 8 is a view of the inner face of the casing showing details of a second embodiment of the brake means.
Figure 11:
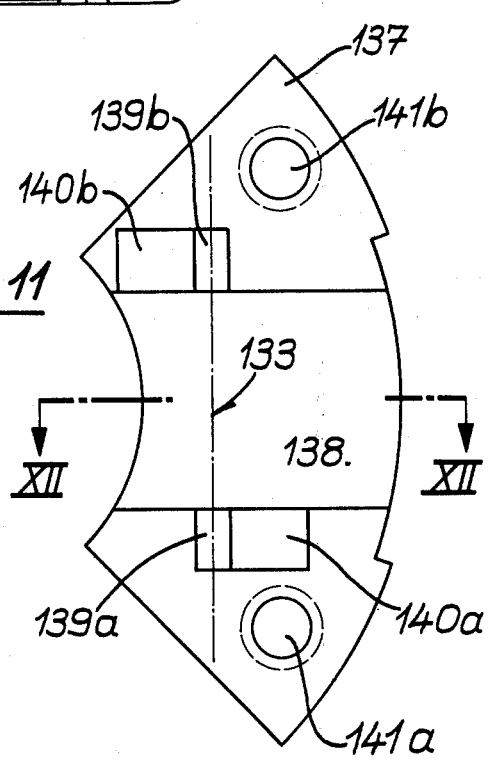
FIG. 11 is a detail view of the crank bolt.
Figure 12:
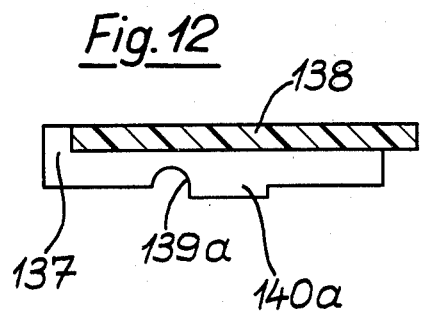
FIG. 12 is a section on the line XII—XII of FIG. 11.
Figure 9:
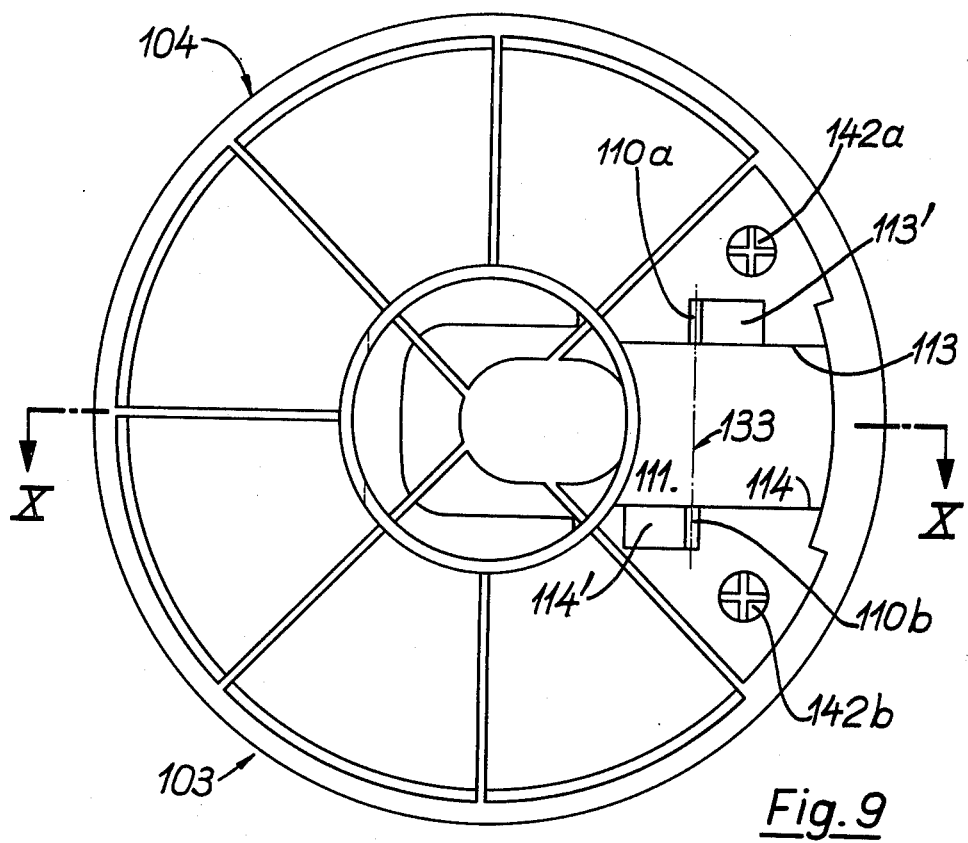
FIG. 9 is a view of the winding drum according to the second embodiment.
Figure 10:
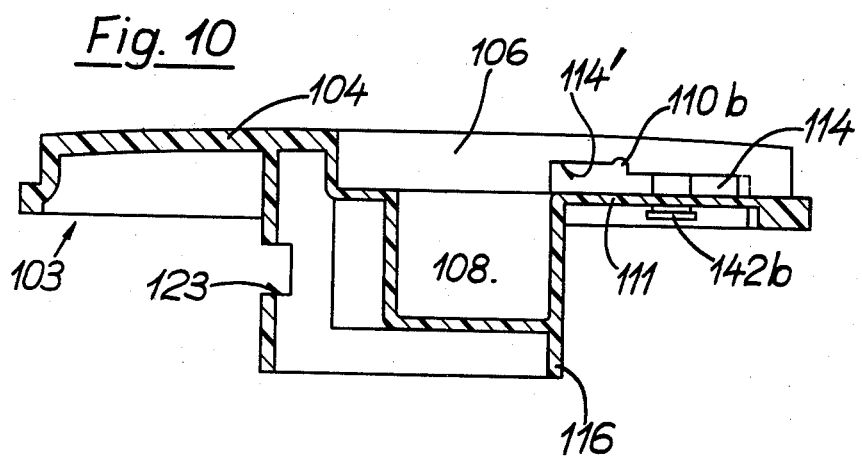
FIG. 10 is a secton on the line X—X of FIG. 9.

In a second embodiment (FIGS. 8 to 14) the tape measure assembly comprises a casing in two parts 101, 101', the part 101 (FIG. 8) being provided with a circular central rib 102 for receiving the end of a central boss 116 of a winding drum 103 which can rotate freely inside this rib 102. The part 101' (FIG. 14) is provided with a stepped circular aperture 131 in which is housed the side-plate 104 of the winding drum 103 in the same way as in the first embodiment.

The side-plate 104 (FIGS. 10 and 14) is provided on its outer face with a diametral slot 106 in which is housed, in the same way as in the first embodiment, the crank 105 and its member 107, the latter being countersunk in an oblong aperture 108 in the side-plate 104, in the inoperative position of the crank 105.

The opposed lateral walls of the slot 106 are cutout to form recesses 113, 114. Part of the base of the slot 106 forms a resilient tongue 111 which allows slight deformation of the base during the assembly of the crank 105.

The ends of the pivot pin 133 of the crank, which is identical to that of the first embodiment, are housed in corresponding curved housings 110a, 110b provided on the inner face of the side-plate 104 on either side of the slot 106 and opening into the recesses 113, 114. These housings are each adjacent to a rectangular recess 113', 114', also provided on the inner face of the side-plate 104 also opening into these slots 113, 114 and located respectively on either side of the axis 133 of the crank and offset with respect to the latter.

A device for locking the crank is provided (FIGS. 11 and 12) which bears against the inner face of the side-plate 104 to keep the lugs of the crank in their respective housings.

This device is constituted by a small plate 137 in the form of a sector, comprising a thin central part 138 corresponding to the location of the tongue 111 and on either side of this thin part 138, a curved housing 139a, 139b respectively, corresponding to the housings 110a, 110b. There is a rectangular boss 140a, 140b respectively, adjacent the curved housing 139a, 139b respectively, the bosses 140a, 140b being located on either side of the axis 133 of the crank and being provided to be inserted in the recesses 113', 114' of the side-plate when the small plate 137 is mounted on the side-plate. This small plate 137 also has two stepped holes 141a, 141b which are symmetrical with respect to its axis, into which are clipped corresponding split feet 142a, 142b formed on the inner face of the side-plate 104.

Once the crank 105 is assembled in its housing in the same manner as in the first embodiment, the small plate 137 is clipped to the inner face of the side-plate 104, which prevents any accidental displacement of the lugs of the crank 105 in their respective housing.

The device for braking the drum according to this embodiment, comprises (FIG. 13) a ring 118 of polyamide resin, having two parallel ribs 121 and a slot 119.

This ring is mounted on a part 120 formed at the center of the casing 101 integrally therewith and has a width greater than the spacing between the two ribs 121, such that once the ring 118 is mounted on this part 120, it is separated and thus pressed resiliently against the inner face of the central boss 116 of the winding drum. The part 120 is a rectangular rib, the longest walls being curved and co-operating with the parallel ribs 121 of the washer, 118.

What is claimed is:

1. A tape measure assembly comprising
   a. a casing
   b. a winding drum mounted within the casing for rotation about a pivot axis and constituted by a side plate having a slot on one face and a central boss on the other face, the slot being defined by a base and opposed lateral walls provided with housings and adjacent recesses extending along said walls
   c. a graduated tape secured at one end to the central boss for winding thereon.
   d. means for effecting a braking action on the drum
   e. means for rotating the drum about its pivot axis and constituted by
      i. a crank
      ii. two lugs integral with the crank and extending in opposite directions to engage in the housings to define a pivot about which the crank can be moved between operative and inoperative positions
   f. means for removably retaining the lugs in their housings and constituted by a resilient part of the slot base in the form of a tongue having a free end portion adjacent the housings and the recesses and adapted to resiliently yield to permit mounting of the lugs along the recess and into the housings, the free end portion of the tongue being directed towards the centre of the side-plate, the tongue being defined by an apertured slit passing through the base of the slot adjacent said recesses, the recesses communicating with the housings to permit passage of the lugs therebetween and the free end of the tongue bearing against the inner face of the crank to retain the lugs in the housings and permit removal therefrom.

2. A tape measure assembly according to claim 1, in which the recesses extend from beside the housings through an enlarged opening into the housings and being offset from the axis of the crank and being such that when the crank is introduced into the slot at right-angles to the side-plate and inclined with respect to the longitudinal axis of the slot, the lugs of the crank can be forced through the enlarged opening by rotating the crank.

3. A tape measure assembly according to claim 2 in which the drum braking means is constituted by an open ring freely mounted on the axis of rotation of the casing, the ring being prevented from rotating by a pin integral with the axis of rotation and being pressed resiliently against the inner wall of the central boss of the winding drum by a spring housed in a diametral groove of the axis of rotation.

4. A tape measure assembly according to claim 3, in which the ring and central boss are made from two different materials.

5. A tape measure assembly according to claim 4, in which the materials are plastics.

6. A tape measure assembly according to claim 4, in which the boss is made from acetate resin.

7. A tape measure assembly according to claim 4, in which the ring is made of polyamide resin.

8. A tape measure assembly according to claim 2, in which the tape is detachably fixed in a slot in the lateral wall of the winding drum arranged in a plane perpendicular to the axis of the drum, the tape having recesses in one end so as to form a hook which co-operates with the edges of said slot.

9. A tape measure assemby according to claim 8, in which the width of the tape between the recesses corresponds to the width of the slot.

10. A tape measure assembly according to claim 8, in which the sides of the slot parallel to the axis of the drum are chamfered.

11. A tape measure assembly according to claim 2, in which the casing is provided with a housing, into which the outlet for the tape opens and being such that it can accommodate a pulling ring mounted on the free end of the tape, the ring being releaseable by a clearance provided in the casing.

12. A tape measure assembly according to claim 2, in which the tongue is defined laterally by the longitudinal recessess over a certain length in the opposed lateral walls of the slot and in which curved housings for receiving the lugs of the crank are provided on the inner face of the side-plate of the drum on either side of the slot and open into said recesses.

13. A tape measure assembly according to claim 2, in which the drum braking means are constituted by a split ring of polyamide resin comprising two parallel ribs, between which is forcibly inserted a member formed at the center of the casing, the member having a width greater than the spacing between the two ribs in order to separate the periphery of the ring and press it against the inner wall of the central boss of the winding drum.

14. A tape measure assembly according to claim 13, in which the walls of the central member of the casing co-operating with the parallel ribs of the ring are curved.

15. A tape measure assembly according to claim 2, in which a device is provided for locking the lugs of the crank in their respective housings.

16. A tape measure assembly according to claim 15, in which the locking device is constituted by a plate in the form of a sector, comprising a central part corresponding to the tongue and two symmetrical outer parts each comprising a curved housing corresponding to the housings for the lugs of the crank provided in the side-plate, and bosses forming an abutment, adjacent to the curved housings, and respectively provided on either side of the axis of the crank pin and also means for attachment to the side-plate.

17. A tape measure assembly according to claim 16, in which the means for attachment to the side-plate comprise two stepped holes in which are clipped elastic feet formed on the inner face of the side-plate.

* * * * *